Patented Jan. 3, 1950

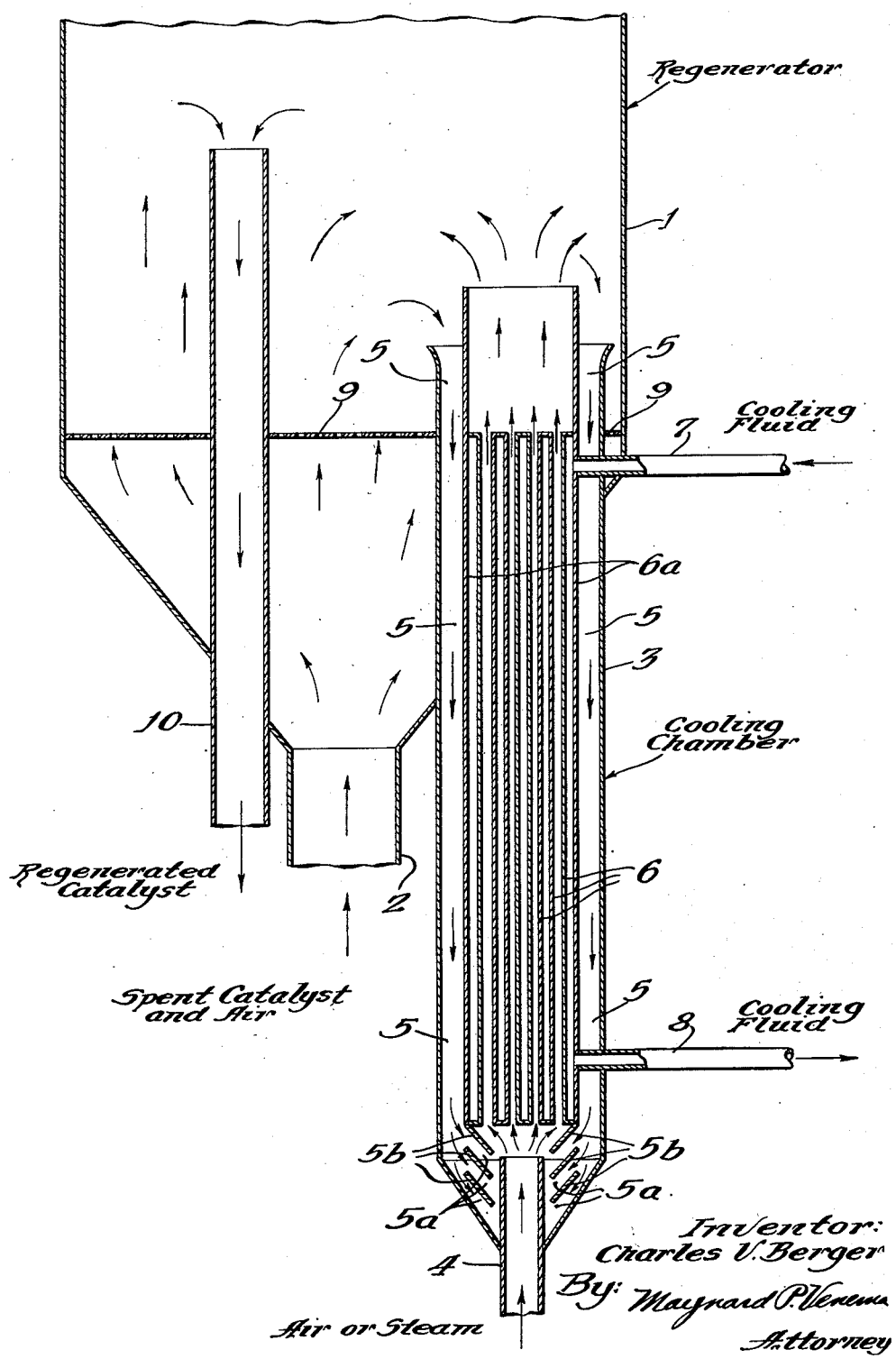

2,492,948

UNITED STATES PATENT OFFICE 2,492,948

CONTROLLING CATALYST REGENERATION TEMPERATURE

Charles V. Berger, Minneapolis, Minn., assignor to Universal Oil Products Company, Chicago, Ill., a corporation of Delaware Application October 5, 1945, Serial No. 620,422

3 Claims. (Cl. 252—417)

This invention relates to improvements in methods of controlling the temperature of catalyst particles in the regenerating zone where combustion of carbonaceous deposits on the catalyst particles is effected.

It is well known that in catalytic conversion operations the temperature of the catalyst in the regenerator should not exceed 1200° F. to any appreciable extent, or there may be serious deterioration of the catalyst. On the other hand the temperature of the catalyst in the regenerator must not fall to a point where combustion is substantially retarded. Regeneration temperatures, therefore, should be maintained in the range of 800–1200° F.

Heretofore, in order to dissipate a part of the heat of combustion when regenerating a catalyst some processes cool some of the catalyst particles undergoing regeneration by withdrawing some of the catalyst from the regenerator, passing the catalyst over coils through which is circulated a cooling fluid or conversely, through tubes over which the cooling medium is circulated, and discharging the catalyst back into the regenerator. In other processes the catalyst particles are cooled only by indirect heat exchange within the regenerator. In either of these methods there is virtually a once-through passage of given catalyst particles over the cooling coils or through the tubes and therefore insufficient cooling of some particles.

The features of my invention will be more clearly understood by reference to the accompanying drawing and the following description thereof, in which:

The figure is a cross-sectional elevation through the catalyst regenerator and cooling chamber.

In the present invention the catalyst particles are cooled by the combined action of heat transfer media in direct and indirect heat exchange relation. Air or steam or both which act as direct heat exchange media are also used to recycle a portion of the catalyst particles in turbulent flow through tubes over the outside surface of which a cooling fluid is passed in indirect heat exchange with the catalyst particles. The propulsive effect of the air or steam not only causes a scrubbing action of the catalyst particles on the inside surface of the cooling tubes when recycling the catalyst particles downward over the shell enclosing the cooling fluid and upward through said tubes but causes such agitation of the mass of catalyst within the regenerator as to prevent clogging of the spent catalyst riser. This is important since an uninterrupted flow of catalyst particles from the reactor to the regenerator and return to the reactor is necessary not only for proper conversion but for proper combustion and regulation of the regeneration temperature.

The figure shows diagrammatically in elevation, one form of apparatus in which my invention may be practiced wherein spent catalyst from the conversion reactor is forced by air into regenerator 1 at the bottom through connection 2. Combustion of carbonaceous deposits on the spent catalyst particles occurs as these particles are forced upward through the regenerator. Rejection of part of the heat of combustion is accomplished in the manner heretofore described by the combined action of direct and indirect heat exchange media as follows:

A direct cooling medium such as air or steam which is injected into cooling chamber 3 through the extended opening of inlet tube 4, recycles regenerated catalyst particles downward through annular space 5 into annular spaces 5a formed by baffles 5b and forces these particles upward through tubes 6 which are enveloped by a cooling fluid which is enclosed in shell 6a entering through pipe 7, passing downward in a zig-zag path by means of baffles (not shown) in countercurrent indirect heat exchange relation with the catalyst and leaving through pipe 8. The upper openings of tubes 6 are arranged to coincide with the openings in regenerator grid 9. Regenerated catalyst particles cooled to the proper temperature for return to the reactor leave regenerator 1 through standpipe 10.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

I claim:

1. In a process for regenerating contaminated catalyst particles wherein said particles and a regenerating gas are passed upwardly into a regenerating zone, carbonaceous deposits on said catalyst are removed by combustion within said regenerating zone, and regenerated catalyst particles are withdrawn from said regenerating zone, the method of controlling the temperature of said combustion which comprises withdrawing an annular stream of catalyst particles downwardly from said zone and cooling said stream during the downward passage thereof by indirect heat exchange with a cooling fluid, commingling said stream with an upwardly flowing cooling gas and passing the resultant mixture upwardly in a plurality of streams through the central space defined by said downflowing annular stream, cooling said plurality of streams during the upward passage thereof by indirect heat exchange with said first named cooling fluid, and discharging the resultant cooled mixture into said regenerating zone.

2. The process of claim 1 further characterized in that said cooling gas comprises air.

3. The process of claim 1 further characterized in that said cooling gas comprises steam.

CHARLES V. BERGER.

REFERENCES CITED

The following references are of record in the file of this patent:

UNITED STATES PATENTS

| Number | Name | Date |
|---|---|---|
| 1,363,323 | Kehoe | Dec. 28, 1920 |
| 2,347,682 | Gunness | May 2, 1944 |
| 2,361,978 | Swearingen | Nov. 7, 1944 |
| 2,363,874 | Krebs | Nov. 28, 1944 |
| 2,367,351 | Hemminger | Jan. 16, 1945 |
| 2,395,106 | Day et al. | Feb. 19, 1946 |
| 2,412,152 | Huff | Dec. 3, 1946 |
| 2,425,969 | Utterback | Aug. 19, 1947 |
| 2,431,630 | Arveson | Nov. 25, 1947 |